UNITED STATES PATENT OFFICE.

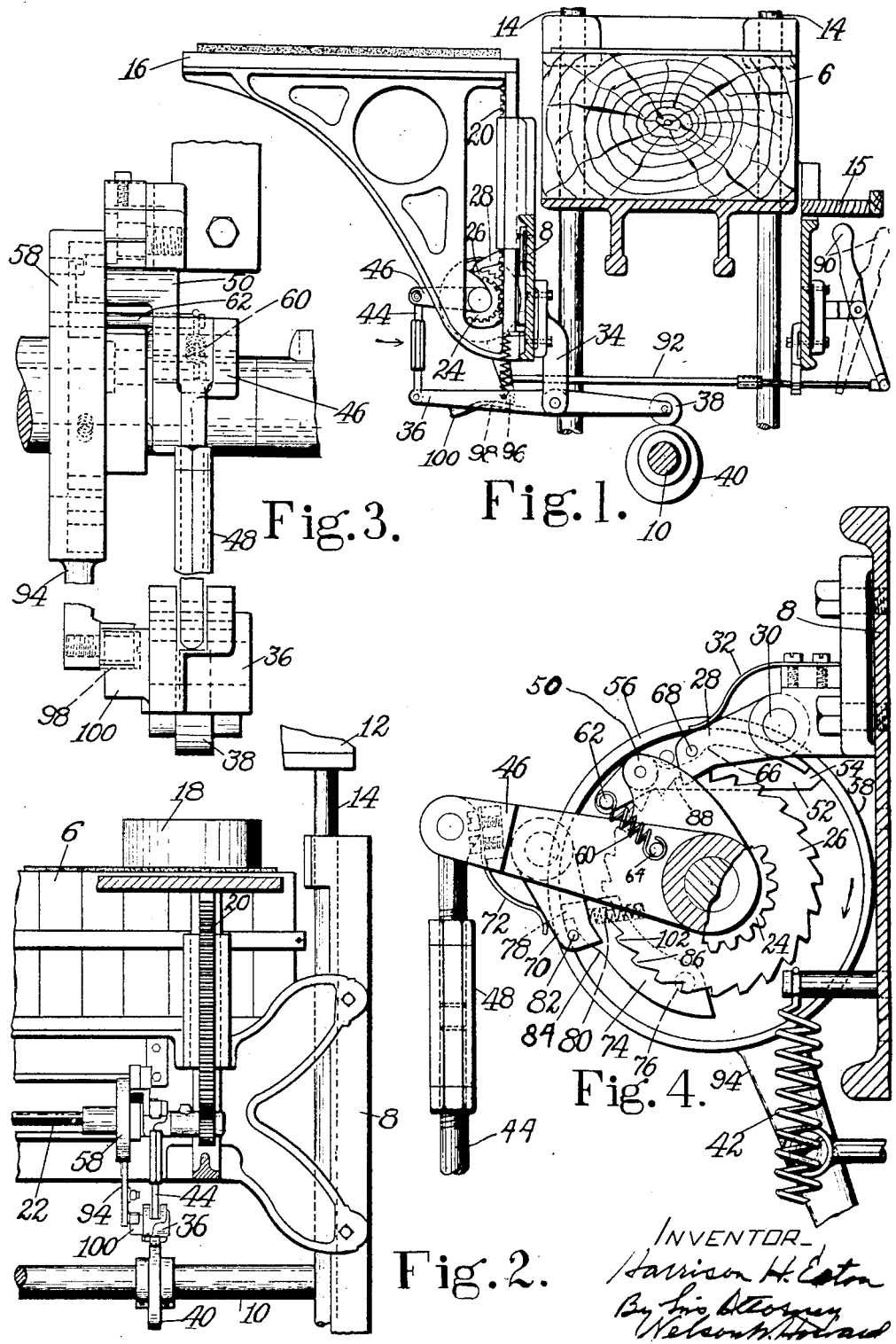

HARRISON H. EATON, OF BEVERLY, MASSACHUSETTS, ASSIGNOR TO UNITED SHOE MACHINERY CORPORATION, OF PATERSON, NEW JERSEY, A CORPORATION OF NEW JERSEY.

WORK-SUPPORT FOR CUTTING-MACHINES.

1,387,695.     Specification of Letters Patent.     Patented Aug. 16, 1921.

Application filed December 9, 1918. Serial No. 265,902.

*To all whom it may concern:*

Be it known that I, HARRISON H. EATON, a citizen of the United States, residing at Beverly, in the county of Essex and State of Massachusetts, have invented certain Improvements in Work-Supports for Cutting-Machines, of which the following description, in connection with the accompanying drawings, is a specification, like reference characters on the drawings indicating like parts in the several figures.

This invention relates to cutting machines, and more particularly to work support mechanisms for cutting machines.

In its illustrated application the invention relates to cutting machines of a type known commercially as sole cutting machines, of which an example is shown and described in United States Letters Patent granted to Henry Parsons, No. 368,108, bearing date of August 9, 1887. This machine comprises a cutting bed upon which the work is supported during the cutting operations and which receives the thrust of the die, and also a crosshead operating as a presser member to force the die through the work. While the invention is shown embodied in a machine of the kind described, it will be understood that the invention is not so limited.

Ordinarily the sole cutting machine shown in the Letters Patent to Parsons is provided with a table fixedly secured to the rear girt or rear side of the cutting bed support, so that said table presents a supporting surface for the work substantially in the plane of the upper surface of the cutting bed. This table is designed to support two or three hides in such a position that they are accessible to the operative and may be drawn forwardly one at a time on to the cutting bed. When the supply on the table has been used up in the cutting operations it then becomes necessary for the operative to pass around to the rear of the machine to pick up other hides from the stack on the floor and place them on the support. If the hides have been carefully prepared and packed so that each is relatively flat and smooth and free from folds and corrugations, it is practicable to place two or three of the hides on the table at one time and draw them successively forwardly into cutting position. It is obvious that the conditions which limit the supply of material on the table to the extent indicated impose the necessity of frequent trips by the operative back and forth from front to back of the machine in cutting up a given stack of hides, with a consequent expenditure of time and effort that reduces the efficiency of both the operative and the machine.

It is an object of the present invention to provide an improved table or work support mechanism which will sustain a stack of hides sufficient for cutting operations over an extended period of time, and which will present the hides successively in a location accessible to the operative so that they may be readily reached and drawn forwardly into position for the cutting operation.

In accordance with this object, a movable work support is provided with power means for intermittently adjusting the support vertically, the illustrated construction and arrangement being such that the work support is at all times under the control of the operative.

In a preferred form of the invention the work support is constructed and arranged to be movable upwardly at the will of the operative to present the top piece of work and each succeeding top piece in a position closely adjacent to the plane of the upper surface of the cutting bed of the machine, so that said pieces may be readily drawn forwardly into cutting position. Preferably provision is made for lowering the work support to its lowermost position by power means under the control of the operative, so that a fresh stack of hides may be readily placed thereon.

Other objects and features of the invention will be apparent from a consideration of the following description of the preferred form of the invention illustrated in the accompanying drawings, in which, Figure 1 is an end view partly in section of the cutting machine showing one embodiment of the work support adjusting mechanism;

Fig. 2 is a rear view partly in section of one end of the cutting machine showing the work support adjusting mechanism from the rear;

Fig. 3 is a detail view of the said adjusting mechanism looking in the direction of the arrow in Fig. 1, and Fig. 4 is an enlarged detail view of the pawl and ratchet mechanism which constitutes an important part of the work support adjusting mechanism.

In the illustrative embodiment of the invention the cutting machine is seen to comprise a cutting block 6 supported upon a frame work 8 which provides also bearings for a shaft 10 operative to cause reciprocating movements of the presser member indicated at 12 through connections with pairs of upright rods 14. At the front of the machine is a bracket 15 for the support of a set of movable dies which are used selectively by the operative. Arranged at the rear of the cutting bed 6 is a work supporting table 16 designed to hold a pile of hides or other material which it is desired to cut into blanks. In the process of cutting blanks with this machine the operative stands at the front thereof and draws one sheet at a time from the pile on the work table on to the cutting bed 6. A die 18 is then placed in the desired location on the sheet of material and the presser beam 12 caused to descend to force the die through the material and then to return to its proper position of rest. This operation is rendered possible through the interposition in the operating mechanism of a one-revolution clutch. The steps of placing the die upon the sheet material and causing the operation of the presser member to force the die through the material to cut a blank therefrom is repeated as often as may be necessary to reduce the sheet material to blanks. The operative then removes the scrap from the cutting bed and draws forwardly another sheet from the pile on the work support. Obviously it is most desirable that the sheets of material shall be presented practically in the plane of the upper surface of the cutting bed since when so located the sheets or pieces of work are most readily accessible to the operative. For this reason the machine is provided with means for adjusting the work support so as to present the work in the most accessible location for the operative, the construction and arrangement being such that the work support may be adjusted upwardly as the stack of work on the support diminishes. In the present embodiment of the invention the work support adjusting means is operated from the main shaft 10 through connections hereinafter described. Since each piece of work is operated upon a plurality of times, the well-known work support adjusting mechanism which is automatically operated during the operation of the machine independently of control by the operative would not serve the purpose nor perform the functions desired in cutting machines of the general type referred to above. Hence the power means provided for adjusting the work support is constantly under the control of the operative as will appear from the following description.

In a preferred embodiment of the invention the table 16 is provided with a rack bar 20 either integral therewith or securely attached thereto. Mounted in bearings at the rear of the machine and in parallel relation with the shaft 10 is a counter shaft 22 carrying a gear 24 constantly in mesh with the rack 20. Adjacent to the gear 24 and securely fixed to the shaft 22 is a ratchet wheel 26 with which there is normally engaged a pawl 28 pivotally mounted at 30 upon a projecting portion of the frame 8. The pawl 28 is urged downwardly into contact with the teeth of the ratchet wheel 26 by means of a spring 32 and serves to prevent rotation of the ratchet wheel in a direction to permit lowering of the table. Mounted upon a support 34 fixedly attached to the frame 8 is a lever 36 carrying at its forward end a roll 38 arranged to be operated by an eccentric 40 on the shaft 10, a spring 42 being provided for normally holding the roll 38 in contact with the said eccentric. The other end of the lever 36 remote from the roll 38 is attached by means of a link 44 to an arm 46 pivotally mounted on the shaft 22 in juxtaposition to the ratchet wheel 26. Preferably the link 44 is provided with adjusting means in the form of a turnbuckle 48 so that it may be readily adjusted as to length. Extending laterally from the arm 46 and integral therewith is a member 50 designed to carry pivotally mounted at the extremity thereof a cam member 52 having a foot 54 which is constantly held in contact with the flange 56 of the casing 58 by means of a spring 60 attached at its ends to studs or pins 62 and 64 located respectively on the cam member 52 and on the arm 46. It will be apparent that as the arm 46 is removed downwardly a cam surface 66 on the cam member 52 will engage with a pin 68 on the pawl 28 to cause said pawl to be disengaged from the ratchet wheel 26 thus releasing the shaft 22 for movement in a direction to lower the table. Carried by the arm 46 is a pawl 70 which is pressed by a spring 72 in a direction to engage the teeth of the ratchet wheel 26. The said pawl, however, is normally maintained out of contact with the ratchet wheel by means of a cam member 74 pivoted at 76 to the casing 58 and having a foot 78 normally held into contact with the flange 56 of the casing by means of a spring 80. Upon movement of the arm 46 downwardly a pin 82 carried by the pawl 70 travels along the cam surface 84 on the cam member 74 and thus controls the approach of the pawl 70 with respect to the ratchet wheel 26. With the parts of the mechanism in the positions shown in Figs. 1 and 4 of the drawings, movement of the arm 46 through rotation of the eccentric on the main shaft 10 results in lowering the table step by step, this being accomplished by the engagement of the pawl 70 with the tooth 86 followed by the disengagement of the pawl 28 from the tooth 88 due to the operation of the cam member 52 on the downward motion of the arm 46 as above described. The pawl 28 is disengaged from tooth 88 while the ratchet wheel is held by pawl 70 and tooth 86 so that the weight of the table is not brought to bear suddenly upon the tooth which at any given time is depended upon to hold the table. On the return movement of the arm 46 upwardly the ratchet wheel turns in the direction of the arrow (Fig. 4) until the pawl 28 engages the next tooth on the ratchet wheel to the left of the previously engaged tooth 88, thus lowering the table the distance between two successive teeth of the periphery of the ratchet wheel. These operations which progressively lower the table continue so long as the lever 90 occupies the solid-line position shown in Fig. 1 of the drawings. When it is desired to cause the operated mechanism to raise the table, this manually controlled member 90 is shifted to dotted-line position, thus causing, through the link connection, 92, rotative movement of the casing 58 in the direction of the arrow in Fig. 4, the link connection 92 being pivotally attached to an arm 94 integral with the casing. Movement of the arm 94 in the direction described carries the roll 96 at the lower end of the arm beyond the seat 98 in the ledge 100 fixedly attached to or integral with the lever 36. This movement of the casing relatively positions the cam member 74 and the pawl 70 so that the pawl occupies a position just above and in line with the tooth 102 on the ratchet wheel 26. Thus when the arm 46 is depressed on rotation of the eccentric 40 the pawl 70 immediately engages the tooth 102 and causes rotation of the ratchet wheel 26 and thus of the shaft 22 in a direction to cause lifting of the rack 20 and the attached table or work support, each step in the rotation being retained by the action of the pawl 28, which pawl is caused to engage the next succeeding tooth to the right just prior to the termination of the downward movement of the arm 46. When it is desired that the table remain stationary the manually controllable lever 90 is positioned in a location intermediate the positions occupied according to the foregoing description, thus positioning the roll 96 on the lower end of the arm 94 in the seat 98. By this position of the arm 94 the roll 38 on the lever 36 is held practically out of contact with the eccentric 40 so that rotation of the main shaft 10 does not effect operation of the table adjusting means.

In the operation of the machine the operative may first cause the table to be lowered to receive a stack of hides or other pieces of material sufficient for operation of the machine over an extended period, this being accomplished by throwing the manually controlled lever over into the solid line position shown in Fig. 1. Whenever it becomes necessary or desirable to cause the table to be raised the said manually controlled member 90 is shifted over into the dotted line position in Fig. 1, thus causing the power mechanism to raise the work support step by step, during the normal operation of the machine, until the upper layers of material are in suitable position for pulling forwardly over the cutting bed. The table or work support is then maintained in the desired position upon swinging the manually controllable member 90 to the vertical position intermediate the other two described and in what may be termed the neutral position of the said controlling lever. While the lever is in this position the roll 38 is practically out of contact with the eccentric on the main shaft or at least is in such a position as to cause idle operation of said lever 36. The table is allowed to remain in adjusted position until the pieces of work at the top of the pile are no longer readily accessible to the operator who must reach over the cutting bed in order to draw the work forwardly into operative position. Whenever the pile of work on the support has been lowered beyond a certain point determinable by the operative the controlling lever 90 may be actuated to cause the power means to adjust the table as much as may be desired.

Having fully described my invention, what I claim as new and desire to secure by Letters Patent of the United States is:

1. In a sole cutting machine, a cutting bed, power means for operating on work on the bed, a work support, and power means for moving the work support at intervals determinable by the operative to present the pieces of work supported thereon successively in selected positions closely adjacent to the plane of the upper surface of the cutting bed.

2. In a sole cutting machine, a cutting bed, a power operated work support for sustaining pieces of work in superimposed relation, and for lifting said pieces successively into the plane of the cutting bed, and means accessible to the operative at the front of the machine for causing actuation of the work support at selected intervals during a series of cycles of the machine to present the pieces of work successively in positions approximately in the plane of the cutting operations.

3. In a sole cutting machine, a cutting bed, a presser member and operating means therefor, a work support for supporting and progressively presenting pieces of work in the plane of the cutting bed and constructed and arranged to be operated by the operating means for the presser member at intervals determinable by the operative and during the continued operation of said means.

4. In a sole cutting machine, a cutting bed, a presser member and operating means therefor comprising a shaft under the control of the operative, a work support for presenting work to the cutting bed, and means operated from said shaft at the will of the operative for imparting to said work support intermittent movements in a vertical direction.

5. In a sole cutting machine, a cutting bed, a presser member and operating means therefor comprising a shaft, a work support for presenting work in position to be readily shifted to the cutting bed, and operating connections between said shaft and said work support under the control of the operative so that the successive operations of the work support take place at the will of the operative.

6. In a machine for operating on work, a work support for sustaining superimposed pieces of work, power means for moving the work support to present the pieces successively in positions adjacent to the plane of operations, and means at all times under the control of the operative for causing the actuation of said power means at any desired points in a series of cycles of the machine.

7. In a sole cutting machine, a cutting bed, a work support, located at the rear of the cutting bed, power means for moving the work support to bring the work on the support into desired relation to the bed, and means at all times under the control of the operative for causing the actuation of said power means to move the work support and to stop it in any desired position while the machine continues to operate.

8. In a sole cutting machine having a cutting bed, a work support at the rear of the cutting bed for sustaining pieces of work, power means comprising a shaft for raising the work support to such a position that the operative standing at the front of the machine can reach the pieces of work over the cutting bed, and means under the control of the operative for holding the work support stationary in the desired location while said shaft continues to rotate.

9. In a sole cutting machine having a cutting bed, a work support for sustaining pieces of work, power means for raising the work support to present each piece of work in succession adjacent to the plane of cutting operations, means accessible to the operator at the front of the machine for holding the work support stationary in the desired location during continued operation of the machine through a plurality of cycles, and means for causing the lowering of the work support into position for a fresh supply of material.

10. In a machine of the class described, a work support, means for automatically lifting the work support to present the top piece of work and each succeeding top piece in position to be readily reached by the operative standing at the front of the machine, and means under the control of the operator for stopping the first-mentioned means without interrupting the operation of the machine.

11. In a sole cutting machine, a cutting bed, a work support at the rear of the cutting bed for sustaining a stack of hides, power mechanism for operating said support, and manually operable means in front of the cutting bed for causing actuation of the work support, at selected intervals in the operation of the machine, to present the hides successively substantially in the plane of the cutting operations.

12. In a machine for operating on work, a work support, power means for moving the work support to present the pieces of work supported thereon successively in the plane of operations, and manually operable means for controlling said first mentioned means to determine the time of operation thereof with respect to a plurality of cycles of the machine.

13. In a machine of the class described, a work support, and automatically operated means for intermittently lifting the work support at intervals determinable by the operative to present the top piece of work and each succeeding top piece in position to be readily reached by the operative standing at the front of the machine.

14. In a machine of the class described, means for operating on work, power means for causing the operation of the first-mentioned means, a work support for sustaining pieces of work in superimposed relation, power means for intermittently moving the work support, and manually operable means for controlling said power means independently of the first-mentioned power means to cause intermittent movements of the work support upon one actuation of said manually operable means.

15. In a sole cutting machine, a cutting bed, a presser member and operating means therefor comprising a shaft, a work support for presenting work in position to be readily shifted to the cutting bed, operating connections between said shaft and said work support to lift the support intermittently, and manually operable means for controlling said connections during the rotation of said shaft.

16. In a sole cutting machine having a cutting bed, a work support having a rack secured thereto, a gear wheel in constant mesh with said rack, a pawl coöperating with the gear wheel to hold the support in desired position, and power means for operating said gear wheel selectively in either direction at the will of the operative to raise or lower said work support without interfering with the operation of the machine.

17. In a sole cutting machine, a cutting bed, a work support movable vertically to present pieces of work successively in position for ready transfer to the cutting bed, automatically operated means for raising and lowering the work support, and means under the control of the operative for maintaining the work support in any desired location during continued operation of the machine.

18. In a machine of the class described, a work support having a rack secured thereto, a gear wheel in constant mesh with said rack, means for automatically operating said gear wheel selectively in either direction to raise or lower said work support, and means coöperating with the gear wheel for locking the work support in raised position.

19. In a machine of the class described, a work support, and power means for moving the work support comprising a ratchet wheel, a pawl normally engaged with said wheel to hold it against rotation in one direction, a second pawl movable to turn the wheel, and cam means for governing the pawls so that the work support may be raised or lowered by the alternate action of the pawls.

20. In a machine of the class described, a work support and power means for moving the work support comprising a ratchet wheel, a pawl normally engaged with said wheel to hold it against rotation in one direction, a second pawl movable to turn the wheel, and means for operating the second pawl to raise or lower the work support by turning said wheel and for operating both pawls in such manner that the second pawl releases the wheel after the first or holding pawl is engaged therewith.

21. In a machine of the class described, a cutting bed, power means for operating on work on the bed, said power means being controllable by the operative, a work support, power means comprising a pawl and ratchet mechanism for moving the work support to cause the latter to present the pieces of work successively in the plane of the upper surface of the cutting bed, and a manually operable member at the front of the machine for controlling the ratchet mechanism to raise or lower the work support.

22. A machine designed to operate throughout a plurality of cycles upon each piece of work comprising a bed for supporting the work during operations thereon, a support for pieces of work which are later to be transferred to the bed, and power means for moving the work support at intervals determinable by the operative to present the pieces of work supported thereon successively in or closely adjacent to a plane which corresponds to the plane of the upper surface of the bed so that pieces of work may be readily transferred from the support to the bed.

23. A machine designed to operate throughout a plurality of cycles upon each piece of work comprising a bed for supporting work while it is being operated upon, a work support for presenting work in position to be readily shifted to the bed, a power shaft, operating connections between the shaft and the work support, and manually operable means comprising a lever at the front of the machine, for controlling said connections during continued operation of the machine.

24. In a machine of the character described, a work support having a rack secured thereto, a gear wheel in constant mesh with said rack, a power shaft, connections between the shaft and the gear wheel for operating the latter comprising a ratchet wheel fixedly secured relatively to the gear wheel, a pawl normally operative to prevent turning of the ratchet wheel in one direction, a second pawl for engaging with the ratchet wheel to control the same during rotative movement thereof in either direction, and means, comprising a lever at the front of the machine, for enabling the operative to control the pawls and thus determine the direction of rotation of the ratchet wheel for raising or lowering the work support.

In testimony whereof I have signed my name to this specification.

HARRISON H. EATON.